US006611925B1

United States Patent
Spear

(10) Patent No.: US 6,611,925 B1
(45) Date of Patent: Aug. 26, 2003

(54) SINGLE POINT OF ENTRY/ORIGINATION ITEM SCANNING WITHIN AN ENTERPRISE OR WORKGROUP

(75) Inventor: Paul Spear, Yamhill, OR (US)

(73) Assignee: Networks Associates Technology, Inc., Santa Clara, CA (US)

( * ) Notice: Subject to any disclaimer, the term of this patent is extended or adjusted under 35 U.S.C. 154(b) by 564 days.

(21) Appl. No.: 09/593,261

(22) Filed: Jun. 13, 2000

(51) Int. Cl.[7] .............................................. G06F 11/00
(52) U.S. Cl. ......................................... 714/38; 713/200
(58) Field of Search ............................ 714/38, 2, 25, 714/45; 713/200, 156

(56) References Cited

U.S. PATENT DOCUMENTS

| | | | | |
|---|---|---|---|---|
| 5,311,591 A | * | 5/1994 | Fischer ........................ 713/156 |
| 5,511,163 A | * | 4/1996 | Lerche et al. ................. 714/28 |
| 6,021,510 A | * | 2/2000 | Nachenberg ................. 713/200 |
| 6,092,194 A | * | 7/2000 | Touboul ...................... 713/200 |
| 6,094,731 A | * | 7/2000 | Waldin et al. ................ 714/38 |
| 6,154,844 A | * | 11/2000 | Touboul et al. .............. 713/201 |
| 6,253,337 B1 | * | 6/2001 | Maloney et al. .............. 714/38 |
| 6,357,008 B1 | * | 3/2002 | Nachenberg ................. 714/38 |

* cited by examiner

Primary Examiner—Robert Beausoliel
Assistant Examiner—Anne L. Damiano
(74) Attorney, Agent, or Firm—Silicon Valley IP Group; Kevin J. Zilka; Christopher J. Hamaty

(57) ABSTRACT

A method and system for on-access virus scanning within an enterprise or in a workgroup, where all users are authenticated against a trusted certificate authority. The first time an item, such as an executable file or document, is accessed, it is scanned for viruses, worms, trojan horses, or other malicious code, and, after the item is determined to be free from threats or is corrected, a certificate noting this information is generated. At the same time a Globally Unique Identifier ("GUID") is generated and appended to the item. The certificate contains various information, including the identity of the scanner that performed the virus check, as well as a means for determining if the original item has been altered since it was scanned, and is stored in a certificate database. The GUID is used as a pointer for locating the certificate. A subsequent user who accesses the item will detect the GUID and can use the GUID to locate the certificate for the item. If the certificate can be located and has not been tampered with and the item has not been changed since it was scanned, the subsequent user can access the item without re-scanning it.

22 Claims, 4 Drawing Sheets

SINGLE POINT OF ENTRY/ORIGINATION ITEM SCANNING WITHIN AN ENTERPRISE OR WORKGROUP

BACKGROUND OF THE INVENTION

Viruses, worms, trojan horses, and other malicious code (referred to herein collectively as "Computer Viruses") are one of the greatest threats to computers and computer networks. In the last ten years the number of known Computer Viruses has grown by at least 100 fold. Each day new Computer Viruses are generated and unleashed on the computing public. A danger associated with distributing items, such as executable files or documents, over a computer network is the risk of spreading a Computer Virus from one computer in the network to others. Non-networked, or stand-alone, computers are not immune from the threat of Computer Viruses. A Computer Virus can be spread to a stand-alone computer when a user inserts an infected diskette or when a user accesses infected files or web pages over the Internet.

Currently, methods and systems exist for scanning items, such as executable files and documents, for Computer Viruses. These methods and systems use software known as virus scanners, which are usually installed on the workstation where items are accessed or, in the case of some network environments, on the server where items are shared between users. Virus scanners generally fall into one of two categories: on-demand scanning and automatic scanning.

On-demand scanning is scanning done at the request of a user. The user issues a command to a virus scanner to scan certain items, and the scanner reports back to the user that the item was either free from Computer Viruses or that a Computer Virus was found. If the scanner finds a Computer Virus, the user is usually given a list of options, e.g., deleting the item, renaming the item, or repairing the item by removing the virus.

Automatic scanning is done by hooking the computer's operating system so that whenever a user attempts to access an item, the virus scanner is activated and the item is automatically scanned. With automatic scanning, so long as the scanner does not detect a threat, such as a Computer Virus, the user is usually not aware that a scan has occurred. If a threat is found the user can usually select from the same list of options that are available for on-demand virus scanning.

Most on-demand and automatic virus scanners scan for Computer Viruses in two ways. First, the target item, i.e., the item to be scanned, is checked for known Computer Viruses. More than 30,000 Computer Viruses are presently known and new Computer Viruses are being discovered every day. In addition to checking for known Computer Viruses, most virus scanners also perform checks for virus-like behavior. A problem with current automatic and on-demand virus scanning is that the same items are usually re-scanned numerous times because users have no way of determining whether an item has been previously scanned. In an on-demand system, even if a user remembers that he previously scanned an item, he has no way of knowing if the item has been altered after it was last scanned. Thus, the safest option is to re-scan the item before re-opening it. The problem of redundant scanning is further exacerbated in systems that employ automatic virus scanning because the virus scanner, through the aid of operating system hooks, automatically scans all items before the user is allowed to access them. This results in the same items being rescanned every time they are accessed, even if they have not been altered since they were last scanned.

As the number of known Computer Viruses increases, the amount of time it takes to scan an item will increase. In the near future, the time required to re-scan items will become prohibitive. Moreover, as new Computer Viruses are detected, virus scanners need to be updated. In some cases, it is necessary to update virus scanners on a daily basis. Because present virus scanners typically reside on each computer in a network, it is often a time consuming task to update all virus scanners within a network. And often, some computers in the network do not receive the most recent version of the virus scanning software.

It is an object of the present invention to create a "trusted" environment inside a network or a computer. Items inside the trusted environment are certified to be free from Computer Viruses so that these items may be used without rescanning. A further object of the present invention is to provide a system and method for allowing virus scanning to be done within a computer network by a central virus scanner. Central virus scanning would greatly facilitate the updating of virus scanning software within a computer network. Central scanning would also allow for a system where the virus scanning is performed on a fast computer even though the items that may carry Computer Viruses are being accessed by slow computers. This would allow slow computers within a network to have the same level of Computer Virus protection as faster computers within the network.

SUMMARY OF THE INVENTION

The present invention is directed at a method and system for identifying items after they have been scanned by a virus scanner and for confirming that an item has been previously scanned for Computer Viruses and has not been altered since it was scanned. The present invention would substantially reduce the number of times an item is scanned. Rather then re-scanning an item each time it is accessed, a user accessing the item would need only to check that the item had been scanned previously and that the item had not been altered since it was scanned. The present invention would also enable virus scanning to be done centrally within an enterprise network. Moreover, it would allow for a system wherein an item is scanned once when it enters into an enterprise network but, so long as the item is not tampered with, is not re-scanned upon access by users within the network.

In one embodiment, the present invention would be used in an enterprise network where all users and virus scanners are authenticated by a central Certificate Authority ("CA"). The CA would use encryption technology to authenticate the virus scanners and the users within the network, and it would assign a public/private key pair to each user and virus scanner. The CA would be responsible for distributing the users' and virus scanners' public keys to the other users and virus scanners within the network. Thus, a level of trust between the users and the virus scanners within the network would exist, and the virus scanners would be able to create digital signatures that could be used to sign items after they are scanned. The network could also comprise a certificate database that would contain certificates for items that have been scanned by trusted virus scanners. The trusted virus scanners would have the ability to create certificates, and the certificates could contain information about whether a Computer Virus was found. In a preferred embodiment, the trusted virus scanners would have the ability to generate and append a unique identifier to each item that it scans. This unique identifier would function as a link between the certificate and the item, i.e., it would serve as an aid in retrieving the certificate for the item from the certificate database.

In the environment described above, the present invention would function as follows: When an item first enters the computer network a virus scanner scans the item for the presence of a Computer Virus. After verifying that the item is clean, i.e., does not contain a Computer Virus, a Globally Unique Identifier ("GUID") is generated and attached to the item. At the same time, a certificate that positively identifies the clean item and the scanner that performed the scan is generated. The GUID is used as a key to locate the certificate, which will be stored in a certificate database. The virus scanner then digitally signs the certificate, the GUID, and the original item with a cryptographic method so that if the certificate, the GUID, or the original item is subsequently altered, others would be aware of this fact. The signed certificate is then sent to a certificate database that can be sorted by GUID.

When the item is later accessed, it is checked for a GUID. If one is present, it is used to access a signed certificate from the certificate database. The signature is checked to verify that the certificate, the GUID, or the original item has not been altered. If the signature is good, i.e., verified, the user is allowed to access the item without re-scanning it. If the signature cannot be verified, the item is re-scanned by the virus scanner, a new GUID and certificate are generated, and the new GUID is appended to the item. The item with the new GUID appended thereto and the certificate are then digitally signed by the virus scanner. The signed certificate is then sent to the certificate database.

If, when a user attempts to access the item, no GUID is detected or a signed certificate cannot be located, the item will be treated as if it were being accessed for the first time and the procedure for first-time item access, as described above, will be followed, i.e., the item will be scanned, a certificate and GUID will be generated, the GUID will be attached to the original item, and the original item, with the attached GUID, and the certificate will be signed by the virus scanner.

Whenever an item is copied, moved, mailed, sent by FTP, or replicated, an operating system hook will move or copy the certificate to a location where it can be accessed the next time a user tries to access the item. If the item is moved to another trusted system that uses a different certificate database, the certificate could also be copied by the operating system hook to a certificate database on the target system. Of course, a trust relationship between the two systems must first be established, and the two systems must share one or more communication means that allow passing of objects with attached GUIDs. The communication means could be a special, direct connection or a public transport, such as the Internet. So long as the two systems trust each other, and trust each other's virus scanners, one system could use the others certificates to ensure that an item has been previously scanned for Computer Viruses by a trusted virus scanner.

DETAILED DESCRIPTION OF THE INVENTION

Figure 1:
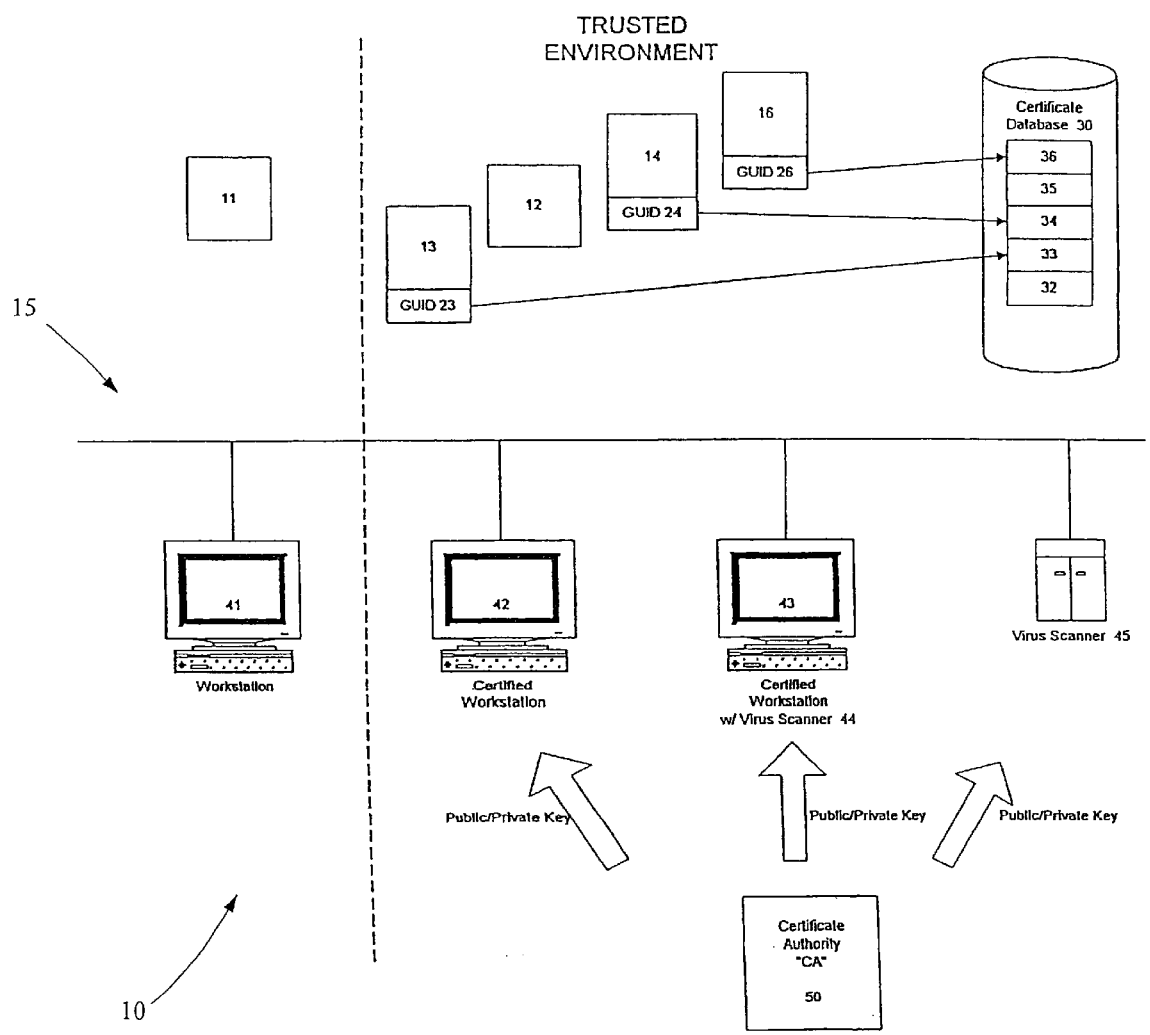
FIG. 1 is a diagram of a computer network that illustrates one embodiment of the the present invention.

Referring now to FIG. 1, which illustrates a preferred embodiment, an enterprise network 10 having a plurality of user workstations 41, 42, 43 connected on a network 15 is provided. The enterprise network 10 comprises an untrusted (or non-secure) environment 11 and a trusted (or secure) environment 12. Trusted environment 12 includes certificate authority ("CA") 50, user workstations 42 and 43, a plurality of items 12, 13, 14, 16 and a certificate database 30. The trusted environment further includes one or more virus scanners. Virus scanners may be stand-alone devices 44. Virus scanners may also reside on one or more of the workstations 43 in addition to or in alternative to one or more stand-alone virus scanners 44.

CA 50 is responsible for establishing a level of trust among users in a network enterprise. This level of trust creates the trusted environment 12. CA 50 establishes this level of trust by authenticating each of the users 42, 43 and each of virus scanners 44, 45 in the trusted environment. Authentication is the process of verifying identity with encryption technology so that one entity in the trusted environment can have a high level of confidence that another entity in the trusted environment is who that entity claims to be. According to a preferred method of authenticating, CA 50 assigns each trusted virus scanner 44, 45 and each user 42, 43 a public/private key pair. Typically, one or more administrators in the enterprise network control the CA.

Virus scanners 44, 45 scan items for known Computer Viruses and/or virus-like behavior. Virus scanners 44, 45 generate a certificate for each item scanned. The certificate certifies, among other things, that the item has been scanned for viruses, that the scanning process has determined that the item is clean, that the virus scan was performed on a specific date, and that the virus scan was performed on a specific virus scanner of specific version having a specific definition file.

Virus scanners 44, 45 also include the function for generating GUIDs 23, 24, 26. A GUID 23, 24, 26 is appended to each of the scanned items 13, 14, 16. The GUIDs serve the function of pointing to a particular record in a database 30 where the certificate pertaining to the scanned item is stored. Routines for generating GUIDs are well known in the art and are incorporated into many commercially available operating systems.

Having been assigned a public/private key pair, virus scanners 44, 45 advantageously are capable of creating digital signatures. As is known in the art, a digital signature functions for electronic documents and items like a hand-written signature does for printed documents. The signature is an unforgeable piece of data that asserts that a named entity created the document to which the signature corresponds and verifies that the signed item has not been altered since it was signed.

In the preferred embodiment the virus scanners do not just digitally sign the certificate. The virus scanners digitally sign the certificate together with the scanned item and the GUID. As a result, a trusted user can determine whether the certificate or the scanned item or the GUID has been tampered with. The digitally signed certificate is referred to herein as a "certagram." In an alternative embodiment, certagrams may also be encrypted. Also, in an alternative embodiment, the certificate, item, and GUID may be signed with separate signatures.

These certagrams are maintained in a database 30. (In an alternative embodiment, the certagrams may themselves be appended to the scanned items. This would eliminate the need for a certagram database and GUIDs.) Users in the trusted environment rely on these certagrams to determine whether a particular item is clean, i.e., free from Computer Viruses, as opposed to having to re-scan the item upon encountering it. This advantageously reduces the number of scans that must be performed within a system. With communication and connection speeds between machines ever increasing and as the number of known Computer Virus and virus-like behavior also increasing, the speed to verify that an item has been previously scanned will approach and eventually exceed the speed to scan an item for Computer Viruses upon accessing it. In other words, scanning an item once and recording this fact in a certagram that can be accessed by the same or subsequent users attempting to access the item is faster then scanning the item each time it is accessed.

A number of additional advantages are achieved by scanning an item once and using cryptographic methods to create a unique certificate of cleanliness that may be relied upon by other trusted users. This system allows scans to be performed on a centralized machine such as virus scanner 45 that may be specifically configured to scan items. Such a specifically-configured virus scanner is significantly faster at scanning items. In addition, it is far more convenient to update a centralized scanner with the latest, most up-to-date virus scanning software. In one embodiment of the present invention that uses a centralized scanner, users in the trusted environment are only permitted to use items that have already been scanned by the centralized scanner. Alternatively, scans may be performed on individual machines such as workstation 43 with virus scanner 44. Once a machine has performed a scan, it generates a certagram and updates the database 30 that the item has been scanned. No trusted users will have to scan the item again unless and until it has been changed. Advantageously, slower machines will be have the highest level of Computer Virus protection by relying on the scans performed on other faster machines in the trusted environment.

An additional advantage is achieved by storing the certagrams in a centralized database. Rules and algorithms can be more easily applied to the database 30 to remove certagrams that were: created with obsolete virus scanners, are older than a pre-selected age, or for any other reason that arises. Because the certagrams may contain various information about the virus scanning process that occurred, a rule based system for phasing out or modifying certagrams or altering the certagram database is easily implemented. Moreover, a rule based system adds flexibility by allowing maintenance to be performed on the database containing the certagrams without directly affecting items that were previously scanned. An administrator may generate rules and apply them to the certagram database in an effort to protect the integrity of the trusted environment created by the present invention. For example, as a new version of virus scanning software becomes available it might be advantageous to prevent users from accessing items that were not scanned with the new version. By applying a rule that removes certagrams from the database that were not created with the new virus scanning software, users will be forced to re-scan the items with the new version before accessing the items. Other rules may also be applied to the database. For example, certagrams older then a prespecified date may also be deleted.

Figure 2:
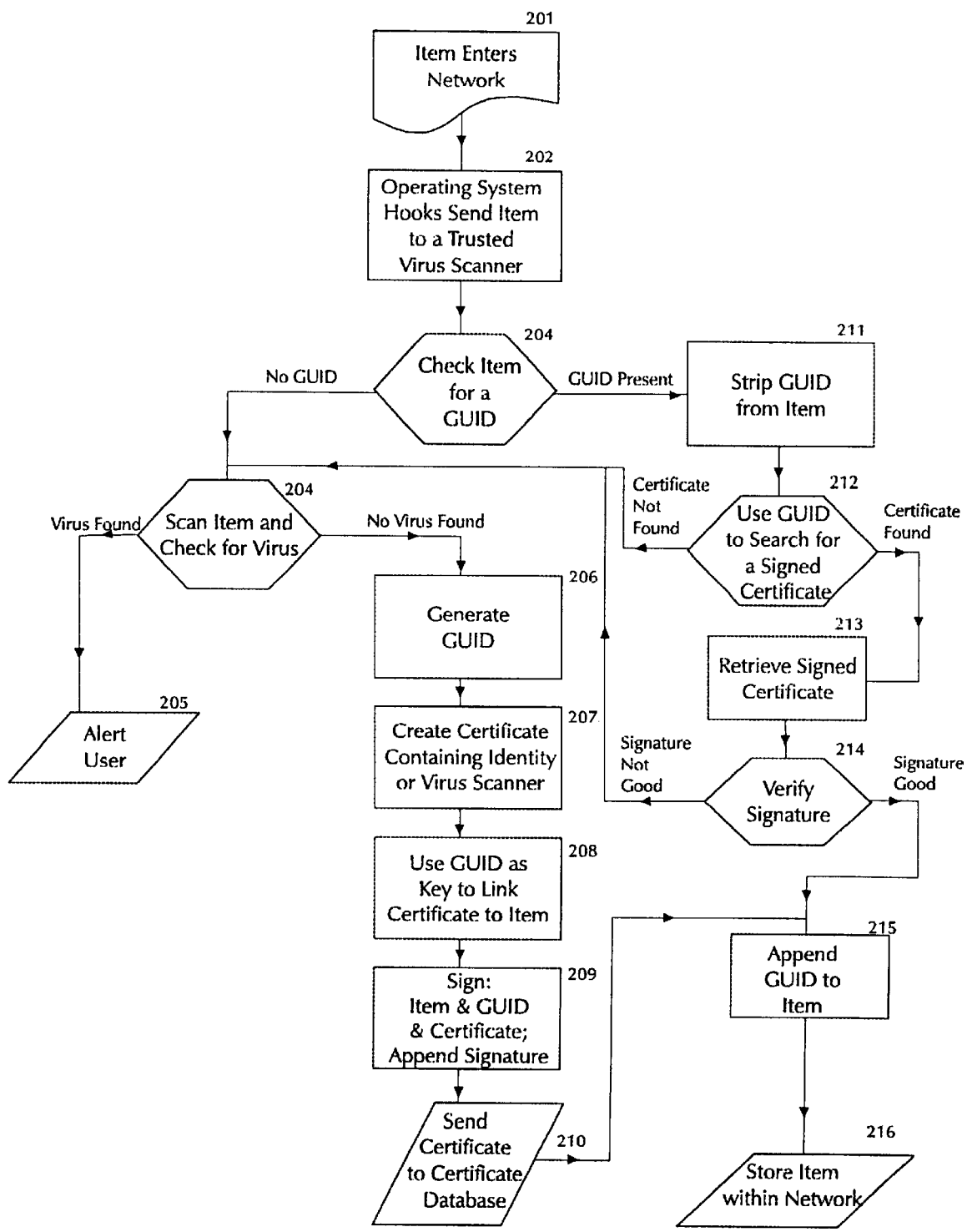
FIG. 2 is a flow chart illustrating the steps that are performed by one embodiment of the present invention when an item enters into a computer network for the first time.

Referring now to FIG. 2, when an item enters a computer network (step 201) operating system hooks intercept the item and send it to a trusted virus scanner (step 202). The trusted virus scanner checks to determine if the item has a GUID attached (step 203). If a GUID is appended to the item, the item may have been previously scanned by the same or another trusted virus scanner.

Assuming that the item does not have a GUID appended to it, the virus scanner scans the item for viruses (step 204). Most modern virus scanners can be configured in a variety of ways. For example, if the virus scanner 45 detects a virus, depending on how it is configured, it might simply alert the user of the presence of a Computer Virus (step 205) or it might prompt the user to repair the item, block the item, or quarantine the item, and/or notify a system administrator of the presence of a threat. If, however, the scanner determines that the item is free from threats, or if the item was repaired so that it is now free from threats, a GUID is generated (step 206). Methods and software for generating GUIDs are well known in the art and any method that creates a reasonably unique identifier may be used. After or during the creation of the GUID, a certificate noting that the item has been found to be Computer Virus-free and noting the identity of the trusted virus scanner is created (step 207). The GUID is used as a key for linking the certificate to the scanned item (step 208). The trusted virus scanner then digitally signs the item, GUID, and certificate with one signature, and appends the signature to the certificate (step 209). The certificate is then stored in a certificate database (step 210) that can be sorted by GUID. The GUID is then appended to the item (step 215). And the item is stored within the Network (step 216).

Assuming now that the virus scanner detected a GUID (at step 203), the virus scanner strips the GUID from the item (step 211) and uses the GUID to search a certificate database for a signed certificate (step 212). If the virus scanner locates a signed certificate, the certificate is retrieved (step 213) and the signature appended thereto is verified (step 214). Various methods for verifying digital signatures are well known in the art and it will be appreciated by those of skill in the art that any method that verifies the identity of the entity that created the signature and the integrity of the data signed with the signature may be employed without deviating from the spirit and scope of the present invention. If the virus scanner is able to verify the signature at step 214, the GUID will be re-appended to the item (step 215) and the item will be sent to a storage device within the network (step 216).

Assuming now that the virus scanner was unable to verify the signature at step 214 or is unable to locate and retrieve a signed certificate (steps 212 and 213), the virus scanner would scan the item for viruses (step 204). Logic flow would then proceed from step 204 in the same manner described above.

Figure 3:
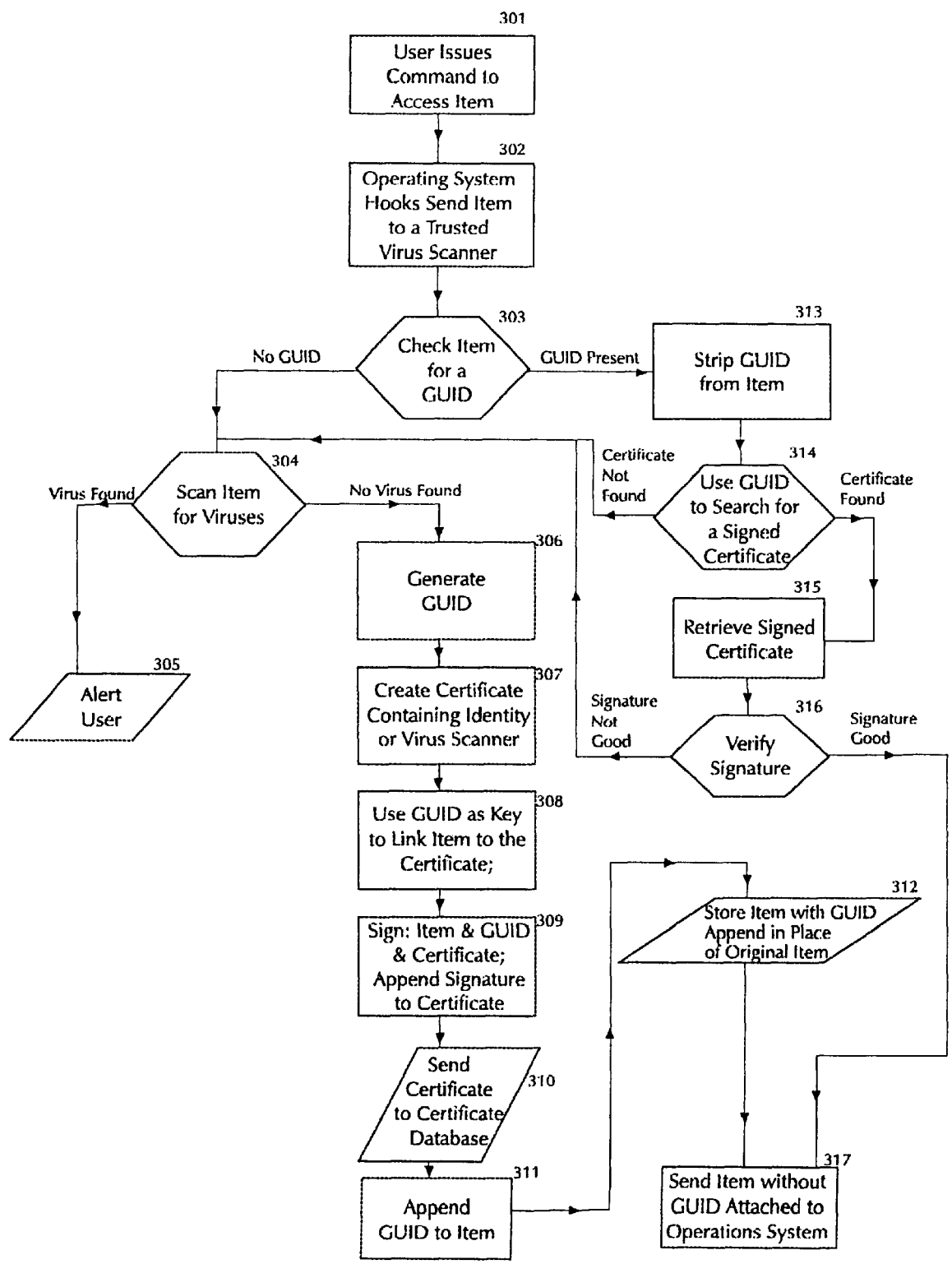
FIG. 3 is a flow chart illustrating the steps that are performed by one embodiment of the present invention when an item is accessed by a user within a computer network.

Referring now to FIG. 3, when a user or service within the network attempts to access an item (step 301) operating system hooks send the item to a trusted virus scanner (step 302). The trusted virus scanner determines if the item has a GUID attached (step 303). If a GUID is appended to the item, the item may have been previously scanned by the same or another trusted virus scanner.

Assuming that the item does not have a GUID appended to it, the virus scanner scans the item for viruses (step 304).

If the virus scanner 45 detects a Computer Virus, depending on how it is configured, the virus scanner could simply alert the user (step 305), or it could prompt the user to: repair the item, delete the item, i.e., move it to a safe place, and/or notify a system administrator of the presence of the virus. If the infected file is repaired it is possible to continue as if the item was never infected.

If, however, the scanner determines that the item is free from threats, or the item is repaired so that it is now free from threats, a GUID is generated (step 306) and a certificate noting that the item has been found to be virus free and noting the identity of the trusted virus scanner is created (step 307). The GUID is used as a key to link the certificate to the item and the GUID is appended to the item (step 308). The trusted virus scanner then digitally signs the item, GUID, and certificate with one signature, and appends the signature to the certificate (step 309). The certificate is then stored in a certificate database (step 310) that can be sorted by GUID. The GUID is appended to the item (step 311) and the item with the appended GUID is save in place of the original item on the system (step 312). In order for the item to be used by applications that are not configured to recognize or utilize the appended GUID, a copy of the item without the GUID appended thereto is sent to the operating system (step 317).

Assuming now that the virus scanner detected a GUID at step 303, the virus scanner strips the GUID from the item (step 313) and uses the GUID to search a certificate database for a signed certificate (step 314). If the virus scanner locates a signed certificate, the certificate is retrieved (step 315) and the signature appended thereto is verified (step 316). Various methods for verifying digital signatures are well known in the art and it will be appreciated by those of skill in the art that any method that verifies the identity of the entity that created the signature and the integrity of the data signed with the signature may be employed without deviating from the spirit and scope of the present invention. If the virus scanner is able to verify the signature at step 316, the item without the GUID will be passed on to the operating system on the user's workstation where it will be allowed to be accessed.

Assuming now that the virus scanner was unable to verify the signature at step 316 or is unable to locate and retrieve a signed certificate (steps 314 and 315), the virus scanner would scan the item for viruses (step 304). Logic flow would then proceed from step 304 in the same manner described above.

Figure 4:
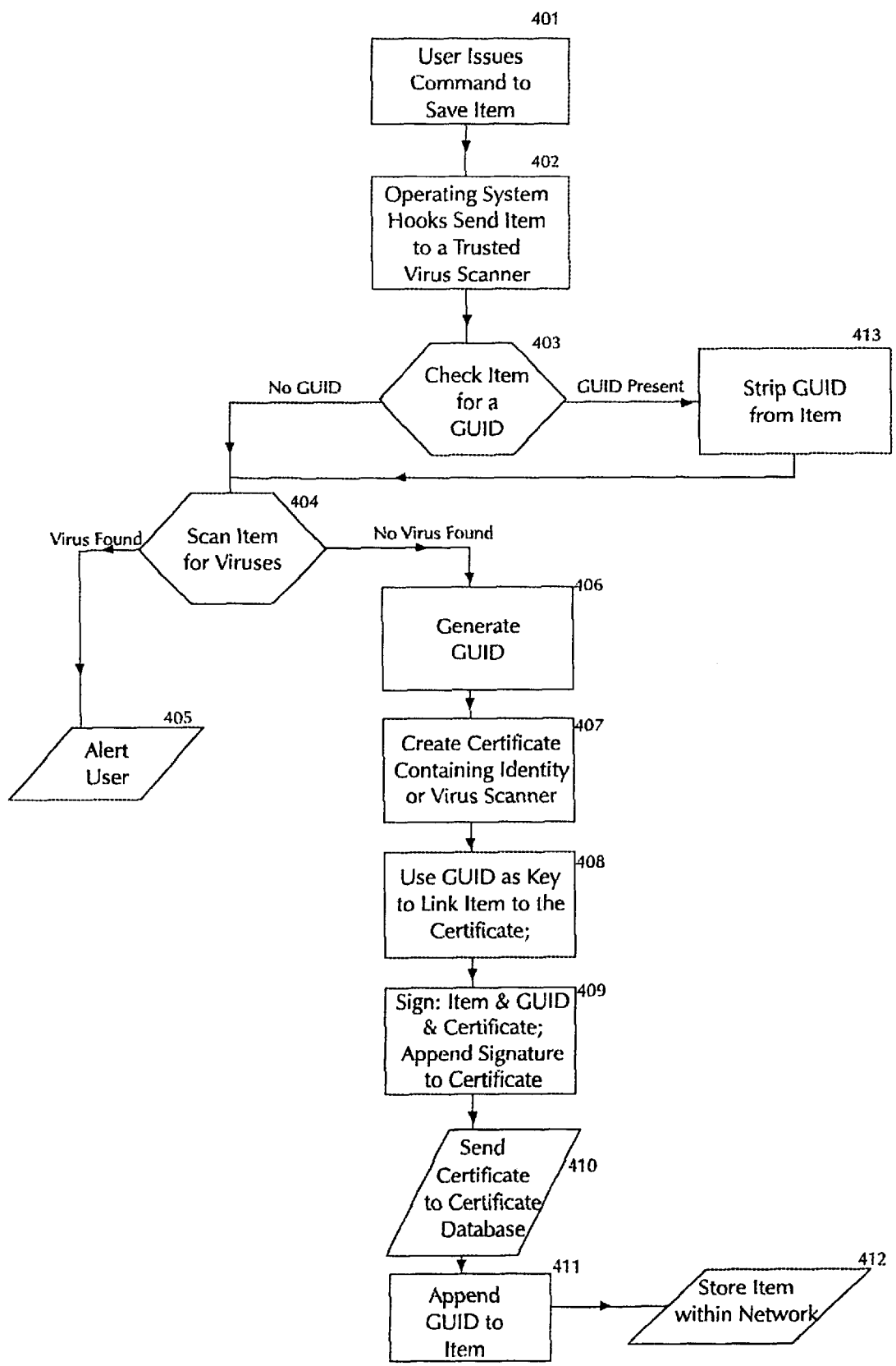
FIG. 4 is a flow chart illustrating the steps that are performed by one embodiment of the present invention when an item is saved by a user within a computer network.

Referring now to FIG. 4, when a user issues a command to save an item (step 401), such as a newly created file operating system hooks send the item to a trusted virus scanner (step 402) to be scanned for Computer Viruses. The trusted virus scanner checks the item to determine if a GUID is attached to the item (step 403). Assuming that no GUID is present (as would be the case when the user creates a new item) the item is then scanned for Computer Viruses (step 404) and if a Computer Virus is detected the user is alerted or other option previously discussed are employed. For example, the item might be deleted, quarantined, blocked or repaired. If the item is repaired or if no Computer Virus was detected, logic flow would continue to step 406 where a GUID would be generated. Next, a certificate containing the identity of the virus scanner that performed the scan and other information would be created (step 407). The GUID is then used as a key to link the certificate to the item (step 408). The item, GUID, and certificate would then be digitally signed and the digital signature would be appended to the certificate (step 409). The certificate with the appended signature would then be stored in a certificate database (step 410). Next the GUID is appended to the item (step 411) and the item with the attached GUID is save in on the system (step 412).

Assuming now that a pre-existing GUID was detected at step 403 (as would be the case when a user is saving changes made to a pre-existing file), the GUID would be stripped from the item (step 413), and the item would be sent to the trusted virus scanner for scanning. Logic flow would then continue at step 404 as described above. It is necessary to scan the item before it is saved because the user who is saving the item could have infected it with a Computer Virus. It is desirable to generate a new GUID and to discard the pre-existing GUID because the pre-existing GUID points to a certificate that was generated on the item before it was saved and corresponds to a scan that was performed before the item was altered by the user. As a result, if the pre-existing GUID were used to retrieve a corresponding certagram, the signature would not verify if the item were altered.

The instant invention may also be modified to work with two distinct networks that have a trust relationship. A first network could use a certagram generated by a.second network. For example, separate networks (referred to herein as "Network 1" and "Network 2") that share one or more communication means that allow passing of objects with attached GUIDs could share certificate information. The communication means could be either a special direct connection (leased line, modem connection, etc.) between the two systems, or a public transport such as the internet where special document types could be tagged to indicate that.

In this example, a Trust Relationship between the two systems exists. A Trust Relationship is an established security concept for two security regions. It allows for each region to set up their users independently in separate databases. The Trust is a set of rules allowing the users from one system access to the other system without having to specifically add the user to both systems. In Certificate Authorities Trusts are used to simplify management, by allowing remote verification of identity using the concept of "I know someone who confirms they know you—therefore I can know you." Given two CAs with a Trust Relationship that has been established it is possible to determine that a certagram came from another database that is using the methodology of the invention. Depending on the nature of the Trust Relationship several different scenarios are possible. For example:

1. Network 1 trusts Network 2 but Network 2 does not trust Network 1. In this case certagrams from Network 2 would be accepted by Network1, and certagrams from Network1 would be discarded by Network2 and Network 2 would rescan items coming from Network 1.
2. Network 1 trusts Network 2 and Network 2 trusts Network 1. Both networks would accept certagrams from the other. No extra scanning would be needed.
3. Conditional Trust. Additional rules could exist. For example, document files with certagrams might be accepted but additional rules might exist for executable files such that one or both systems may as require rescanning of these files when they come from outside.

The foregoing represents preferred embodiments of the invention. Variations and modifications will be apparent to persons skilled in the art, without departing from the inventive concepts disclosed herein. For example, while the invention has been described above with reference to a computer network, it will be appreciated by those skilled in the art that the present invention may be employed in connection with a stand-alone computer. Moreover, the invention may be modified so that the certificate is appended directly to the item. In one embodiment this would eliminate the need for a GUID and a certificate database. All such modifications and variations are intended to be within the scope of the invention as defined in the following claims.

I claim:

1. A method for reducing malicious code within a computer system comprising:
    (a) scanning an item with a trusted virus scanner;
    (b) creating a certificate, if the scanning did not detect a virus, certifying that the item is virus free; and
    (c) appending to the item a pointer pointing to the certificate in a database, wherein the pointer is a globally unique identifier.

2. The method recited in claim 1 further comprising recording the identity of the virus scanner in the certificate.

3. The method recited in claim 1 further comprising signing the pointer, certificate, and item with a single digital signature.

4. A method for reducing computer viruses, worms, trojan horses, and other malicious code within a computer system comprising:
    (a) scanning an item with a trusted virus scanner;
    (b) creating a certificate, if the scanning did not detect a virus, certifying that the item is virus free;
    (c) maintaining the certificate in a database;
    (d) appending to the item a pointer pointing to the certificate in the database, wherein the pointer is a globally unique identifier; and
    before allowing a user to access the item:
        (i) examining the certificate to confirm that the item has been previously scanned by a trusted virus scanner;
        (ii) confirming that the item has not been altered since it was scanned by the trusted virus scanner;
        (iii) confirming that the certificate has not been tampered with.

5. A method for reducing computer viruses, worms, trojan horses, and other malicious code within a computer system comprising:
    (a) scanning an item with a trusted virus scanner;
    (b) creating a certificate, if the scanning did not detect a virus, certifying that the item is virus free;
    (c) maintaining the certificate in a database;
    (d) appending to the item a pointer pointing to the certificate in the database; and
    before allowing a user to access the item;
        (i) examining the certificate to confirm that the item has been previously scanned by a trusted virus scanner;
        (ii) confirming that the item has not been altered since it was scanned by the trusted virus scanner;
        (iii) confirming that the certificate has not been tampered with;
    wherein the item is signed after it is scanned with a first digital signature;
    wherein the pointer is signed after it is generated with a second digital signature;
    wherein the certificate is signed after it is created with a third digital signature.

6. The method recited in claim 5 wherein the confirming that the item has not been altered and the confirming that the certificate has not been tampered with are done by examining a single digital signature.

7. A method for reducing computer viruses, worms, trojan horses, and other malicious code within a computer system comprising:
    (a) scanning an item with a trusted virus scanner;
    (b) creating a certificate, if the scanning did not detect a virus, certifying that the item is virus free; and
    before allowing a user to access the item:
        (i) examining the certificate to confirm that the item has been previously scanned by a trusted virus scanner;
        (ii) confirming that the item has not been altered since it was scanned by the trusted virus scanner;
        (iii) confirming that the certificate has not been tampered with;
    wherein the confirming that the item has not been altered and confirming that the certificate has not been tampered with are performed by verifying multiple digital signatures.

8. A system for checking for computer viruses, trojan horses, worms, and other malicious code comprising:
    (a) at least one computer item capable of carrying computer viruses;
    (b) at least one trusted virus scanner that includes a Certificate Authority and is capable of scanning the item, creating a corresponding certificate relating to the item after it is scanned that indicates the result of the virus scan;
    (c) a corresponding certificate for items that have been previously scanned by the trusted virus scanner certifying that the item is free from viruses; and
    (d) a verifier for verifying that the item has not been altered since it was scanned by the trusted virus scanner and that the certificate has not been tampered with.

9. A system as in claim 8, further comprising an operating system which prevents users from accessing items that are not verified by the verification procedure.

10. The system of claim 9 further comprising software for generating and appending to each scanned item a pointer for pointing to the corresponding certificate in the certificate database.

11. A system as in claim 8, further comprising an operating system which restricts users access to those items that are verified by the verification procedure.

12. A system as in claim 8, wherein the trusted virus scanner is capable of digitally signing the scanned item and the certificate.

13. A system as in claim 12, wherein the verifier comprises a software package that verifies the digital signature.

14. The system of claim 8 further comprising a certificate database for maintaining the certificates.

15. A system for checking for computer viruses, trojan horses, worms, and other malicious code comprising:
    (a) at least one computer item capable of carrying computer viruses;
    (b) at least one trusted virus scanner that is capable of scanning the item, creating a corresponding certificate relating to the item after it is scanned that indicates the result of the virus scan;
    (c) a corresponding certificate for items that have been previously scanned by the trusted virus scanner certifying that the item is free from viruses;
    (d) a verifier for verifying that the item has not been altered since it was scanned by the trusted virus scanner and that the certificate has not been tampered with;

(e) an operating system which prevents users from accessing items that are not verified by the verification procedure; and (f) a Certificate Authority built into the virus scanner.

16. A method for reducing computer viruses, worms, trojan horses, and other malicious code in one or more computer networks comprising:

(a) scanning an item residing in a first network with a virus scanner trusted by the first network;

(b) creating a certificate, if the scanning did not detect a virus, certifying that the item is virus free (d) transmitting a copy of the item to a second network;

(e) transmitting a copy of the certificate to the second network;

wherein a pointer is appended to the item, the pointer capable of pointing to the certificate regardless of whether the certificate is located in the first network or the second network.

17. The method recited in claim 16 further comprising recording the identity of the virus scanner in the certificate.

18. A method for reducing computer viruses, worms, trojan horses, and other malicious code in one or more computer networks comprising:

(a) scanning an item residing in a first network with a virus scanner trusted by the first network;

(b) creating a certificate, if the scanning did not detect a virus, certifying that the item is virus free;

(c) establishing a Trust Relationship between the first network and a second network;

(d) transmitting a copy of the item to the second network;

(e) transmitting a copy of the certificate to the second network;

(f) maintaining the certificate in a second network database; before allowing a user on the second network to access the item:

(i) examining the certificate to confirm that the item has been previously scanned by a virus scanner trusted by a network in a trust relationship with the second network;

(ii) confirming that the item has not been altered since it was scanned by the trusted virus scanner;

(iii) confirming that the certificate has not been tampered with.

19. A method for reducing computer viruses, worms, trojan horses, and other malicious code in one or more computer networks comprising:

(a) scanning an item residing in a first network with a virus scanner trusted by the first network;

(b) creating a certificate, if the scanning did not detect a virus, certifying that the item is virus free;

(c) establishing a Trust Relationship between the first network and a second network;

(d) transmitting a copy of the item to the second network;

(e) transmitting a copy of the certificate to the second network;

before allowing a user on the second network to access the item:

(i) examining the certificate to confirm that the item has been previously scanned by a virus scanner trusted by a network in a trust relationship with the second network;

(ii) confirming that the item has not been altered since it was scanned by the trusted virus scanner;

(iii) confirming that the certificate has not been tampered with;

wherein a pointer is appended to the item, the pointer capable of pointing to the certificate regardless of whether the certificate is located in the first network or the second network.

20. A certificate indicating that a computer item is free from threats comprising:

first portion having information indicating that the item has been scanned by a virus scanner and has been found to be free from computer viruses, trojan horses, worms, and other malicious code; and a second portion comprising a digital signature;

wherein a pointer is capable of pointing to the certificate regardless of where the certificate is located on a network.

21. A certificate as recited in claim 20, wherein the second portion contains a single digital signature for: the computer item, the first portion, and for a unique identifier that links the item to the certificate.

22. A certificate as recited in claim 21, wherein the first portion contains the version number of the virus scanner that performed the scan.

* * * * *

UNITED STATES PATENT AND TRADEMARK OFFICE
CERTIFICATE OF CORRECTION

| | | |
|---|---|---|
| PATENT NO. | : 6,611,925 B1 | |
| APPLICATION NO. | : 09/593261 | |
| DATED | : August 26, 2003 | |
| INVENTOR(S) | : Spear | |

It is certified that error appears in the above-identified patent and that said Letters Patent is hereby corrected as shown below:

In the claims:
col. 9, line 51, replace "item;" with --item:--.

Signed and Sealed this
Twenty-fifth Day of January, 2011

David J. Kappos
*Director of the United States Patent and Trademark Office*